United States Patent
Chen et al.

(10) Patent No.: US 9,237,583 B2
(45) Date of Patent: Jan. 12, 2016

(54) RESOURCE AVAILABILITY FOR PDSCH IN RELAY BACKHAUL TRANSMISSIONS

(75) Inventors: Wanshi Chen, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 774 days.

(21) Appl. No.: 13/099,160

(22) Filed: May 2, 2011

(65) Prior Publication Data

US 2011/0268064 A1  Nov. 3, 2011

Related U.S. Application Data

(60) Provisional application No. 61/330,846, filed on May 3, 2010.

(51) Int. Cl.
| | |
|---|---|
| *H04W 4/00* | (2009.01) |
| *H04W 72/12* | (2009.01) |
| *H04L 5/00* | (2006.01) |
| *H04W 72/04* | (2009.01) |

(Continued)

(52) U.S. Cl.
CPC ........... *H04W 72/1289* (2013.01); *H04L 5/003* (2013.01); *H04L 5/0053* (2013.01); *H04L 5/0094* (2013.01); *H04B 7/2606* (2013.01); *H04W 72/044* (2013.01); *H04W 72/1263* (2013.01); *H04W 84/047* (2013.01)

(58) Field of Classification Search
CPC ... H04L 5/0035; H04L 47/741; H04L 47/781; H04W 72/044; H04W 5/0053; H04W 5/0062
USPC .......................................................... 370/329
See application file for complete search history.

(56) References Cited

U.S. PATENT DOCUMENTS

| | | | | |
|---|---|---|---|---|
| 7,961,688 | B2 * | 6/2011 | Li et al. | 370/336 |
| 8,009,663 | B2 * | 8/2011 | Yamada et al. | 370/329 |
| 8,072,911 | B2 * | 12/2011 | Astely et al. | 370/280 |

(Continued)

FOREIGN PATENT DOCUMENTS

WO   2010039003 A2   4/2010

OTHER PUBLICATIONS

3rd Generation Partnership Project; Technical Specification Group Radio Access Network; Further Advancements for E-UTRA Physical Layer Aspects(Release 9 ), 3GPP Draft; TR 36.814_200, 3rd Generation Partnership Project (3GPP), Mobile Competence Centre; 650, Route Des Lucioles; F-06921 Sophia-Antipolis Cedex; France, vol. RAN WGI, No. San Francisco, USA; 20100222, Apr. 8, 2010, XP050419136, [retrieved on Apr. 8, 2010].

(Continued)

*Primary Examiner* — Ricky Ngo
*Assistant Examiner* — Dewanda Samuel
(74) *Attorney, Agent, or Firm* — Ke Liu

(57) ABSTRACT

Certain aspects of the present disclosure provide techniques for indicating (e.g., by a donor base station) resources available for physical downlink shared channel (PDSCH) transmissions from a base station is provided. Certain aspects of the present disclosure provide techniques for determining (e.g., by a relay node or UE) resources available for physical downlink shared channel (PDSCH) transmissions from a base station.

42 Claims, 12 Drawing Sheets

(51) Int. Cl.
*H04B 7/26* (2006.01)
*H04W 84/04* (2009.01)

(56) References Cited

U.S. PATENT DOCUMENTS

| | | | | |
|---|---|---|---|---|
| 8,230,291 B2* | 7/2012 | Cai | ................ | H04L 1/1896 714/748 |
| 8,245,092 B2* | 8/2012 | Kotecha et al. | ................ | 714/748 |
| 8,249,608 B2* | 8/2012 | Heo et al. | ................ | 370/329 |
| 8,325,606 B2* | 12/2012 | Asanuma | ................ | 370/232 |
| 8,358,603 B2* | 1/2013 | Zhao et al. | ................ | 370/310 |
| 8,363,537 B2* | 1/2013 | Ko et al. | ................ | 370/208 |
| 8,385,281 B2* | 2/2013 | Pan et al. | ................ | 370/329 |
| 8,442,151 B2* | 5/2013 | Lee | ................ | H04B 7/0691 375/295 |
| 8,446,870 B2* | 5/2013 | Nakao et al. | ................ | 370/329 |
| 2009/0046672 A1* | 2/2009 | Malladi et al. | ................ | 370/336 |
| 2009/0270094 A1* | 10/2009 | Ito et al. | ................ | 455/434 |
| 2010/0103901 A1* | 4/2010 | Miki et al. | ................ | 370/330 |
| 2010/0232373 A1* | 9/2010 | Nory et al. | ................ | 370/329 |
| 2010/0254301 A1* | 10/2010 | Blankenship et al. | ................ | 370/315 |
| 2011/0064037 A1* | 3/2011 | Wei et al. | ................ | 370/329 |
| 2011/0151910 A1* | 6/2011 | Kim et al. | ................ | 455/509 |
| 2011/0194412 A1 | 8/2011 | Park et al. | | |
| 2011/0243261 A1* | 10/2011 | Bienas et al. | ................ | 375/260 |
| 2011/0268067 A1* | 11/2011 | Seo et al. | ................ | 370/329 |

OTHER PUBLICATIONS

International Search Report and Written Opinion—PCT/US2011/035061, ISA/EPO—Sep. 2, 2011.

MCC Support: "Draft Report of 3GPP TSG RAN WGI #60bis V0.1.0 (Beijing, China, Apr. 12-16, 2010)", 3GPP Draft; Draft_ReportWG1#60B_V010, 3rd Generation Partnership Project (3GPP), Mobile Competence Centre; 650, Route Des Lucioles; F-06921 Sophia-Antipolis Cedex; France, vol. RAN WGI, No. Montreal, Canada; 20100510, Apr. 19, 2010, XP050448952, [retrieved on Apr. 19, 2010].
NTT Docomo: "Impact of CSI-RS Insertion on Rel-10 UE", 3GPP Draft; R1-102298 CSI-RS Rate Matching, 3rd Generation Partnership Project (3GPP), Mobile Competence Centre; 650, Route Des Lucioles; F-06921 Sophia-Antipolis Cedex; France, vol. RAN WGI, No. Beijing, china; 20100412, Apr. 6, 2010, XP050419540, [retrieved on Apr. 6, 2010].
Qualcomm Incorporated: "DM-RS for R-PDCCH", 3GPP Draft; R1-102345 DM-RS for R-PDCCH, 3RD Generation Partnership Project (3GPP), Mobile Competence Centre; 650, Route Des Lucioles; F-06921 Sophia-Antipolis Cedex; France, vol. RAN WGI, No. Beijing, china; 20100412, Apr. 6, 2010, XP050419574, [retrieved on Apr. 6, 2010].
Tetsushi Abe,3GPP LTE Radio Physical Layer,3GPP Workshop 2, Chennai,[online],3GPP TSG RAN WG1,Jun. 2, 2010,pp.1-53, URL:http://www.3gpp.org/ftp/information/presentations/presentations_2010/2010_06_India/3GPP%20LTE%20Radio% 20Physical% 20Layer%20%28India%29.pdf.
3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).
ZTE: "The interleaving schemes of R-PDCCH",TSG-RAN WG1 #60bis document, 3GPP, Apr. 16, 2010, TSG-RAN WG1 #60bis, R1-101822, pp. 1-6, <URL:http://www.3gpp.org/ftp/TSG_RAN/WG1_RL1/TSGR1_60b/Docs/R1-101822.zip>.

* cited by examiner

RESOURCE AVAILABILITY FOR PDSCH IN RELAY BACKHAUL TRANSMISSIONS

CLAIM OF PRIORITY UNDER 35 U.S.C. §119

The present Application for patent claims benefit of U.S. Provisional Patent Application Ser. No. 61/330,846, entitled, "RESOURCE AVAILABILITY AND RATE-MATCHING FOR PDSCH IN RELAY BACKHAUL TRANSMISSIONS," filed May 3, 2010 and assigned to the assignee hereof and hereby expressly incorporated by reference herein.

BACKGROUND

1. Field

Certain aspects of the disclosure relate generally to wireless communications systems and, more particularly, to techniques for allocating resources for a relay in a telecommunications network.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home Node Bs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

SUMMARY

Certain aspects of the present disclosure provide a method for determining resources available for physical downlink shared channel (PDSCH) transmissions from a base station. The method generally includes identifying resources configured for physical downlink control channel (PDCCH) transmissions from a base station (BS), receiving a PDCCH transmission assigning a PDSCH from the BS, and determining the resources available for the PDSCH transmission based on a resource allocated for the PDCCH transmission and resources assigned in the PDCCH transmission.

Certain aspects of the present disclosure provide an apparatus for determining resources available for physical downlink shared channel (PDSCH) transmissions from a base station. The apparatus generally includes means for identifying resources configured for physical downlink control channel (PDCCH) transmissions from a base station (BS), means for receiving a PDCCH transmission assigning a PDSCH from the BS, and means for determining the resources available for the PDSCH transmission based on a resource allocated for the PDCCH transmission and resources assigned in the PDCCH transmission.

Certain aspects of the present disclosure provide an apparatus for determining resources available for physical downlink shared channel (PDSCH) transmissions from a base station. The apparatus generally includes at least one processor and a memory coupled to the at least one processor. The at least one processor is generally configured to identify resources configured for physical downlink control channel (PDCCH) transmissions from a base station (BS), receive a PDCCH transmission assigning a PDSCH from the BS, and determine the resources available for the PDSCH transmission based on a resource allocated for the PDCCH transmission and resources assigned in the PDCCH transmission.

Certain aspects of the present disclosure provide a computer-program product for determining resources available for physical downlink shared channel (PDSCH) transmissions from a base station. The computer-program product generally includes a computer-readable medium comprising code for identifying resources configured for physical downlink control channel (PDCCH) transmissions from a base station (BS), receiving a PDCCH transmission assigning a PDSCH from the BS, and determining the resources available for the PDSCH transmission based on a resource allocated for the PDCCH transmission and resources assigned in the PDCCH transmission.

Certain aspects of the present disclosure provide a method for indicating resources available for physical downlink shared channel (PDSCH) transmissions from a base station. The method generally includes configuring resources for physical downlink control channel (PDCCH) transmissions from the base station (BS) to a node, transmitting a PDCCH assigning a PDSCH to the node, and providing an indication via the PDCCH to the node that a portion of the resources configured for PDCCH transmissions are available for transmission of the PDSCH.

Certain aspects of the present disclosure provide an apparatus for indicating resources available for physical downlink shared channel (PDSCH) transmissions from a base station. The apparatus generally includes means for configuring resources for physical downlink control channel (PDCCH) transmissions from the base station (BS) to a node, means for transmitting a PDCCH assigning a PDSCH to the node, and means for providing an indication via the PDCCH to the node that a portion of the resources configured for PDCCH transmissions are available for transmission of the PDSCH.

Certain aspects of the present disclosure provide an apparatus indicating resources available for physical downlink shared channel (PDSCH) transmissions from a base station. The apparatus generally includes at least one processor and a memory coupled to the at least one processor. The at least one processor is generally configured to configure resources for physical downlink control channel (PDCCH) transmissions from the base station (BS) to a node, transmit a PDCCH assigning a PDSCH to the node, and provide an indication via the PDCCH to the node that a portion of the resources configured for PDCCH transmissions are available for transmission of the PDSCH.

Certain aspects of the present disclosure provide a computer-program product for indicating resources available for physical downlink shared channel (PDSCH) transmissions from a base station. The computer-program product generally includes a computer-readable medium comprising code for configuring resources for physical downlink control channel (PDCCH) transmissions from the base station (BS) to a node, transmitting a PDCCH assigning a PDSCH to the node, and providing an indication via the PDCCH to the node that a portion of the resources configured for PDCCH transmissions are available for transmission of the PDSCH.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Relaying has been considered for wireless systems, such as LTE-Advanced, as a tool to improve coverage of high data rates, group mobility, temporary network deployment, and the cell-edge throughput and/or to provide coverage in new areas. The A relay node may be wirelessly connected to a radio-access network via a donor base station to provide serves to wireless terminals, or user equipment (UE).

Certain aspects of the present disclosure provide apparatuses and techniques for nodes (such as a relay node or UE) to determine availability of a portion of resources configured for a relay physical downlink control channel (PDCCH) that may be used for physical downlink shared channel (PDSCH) transmissions.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
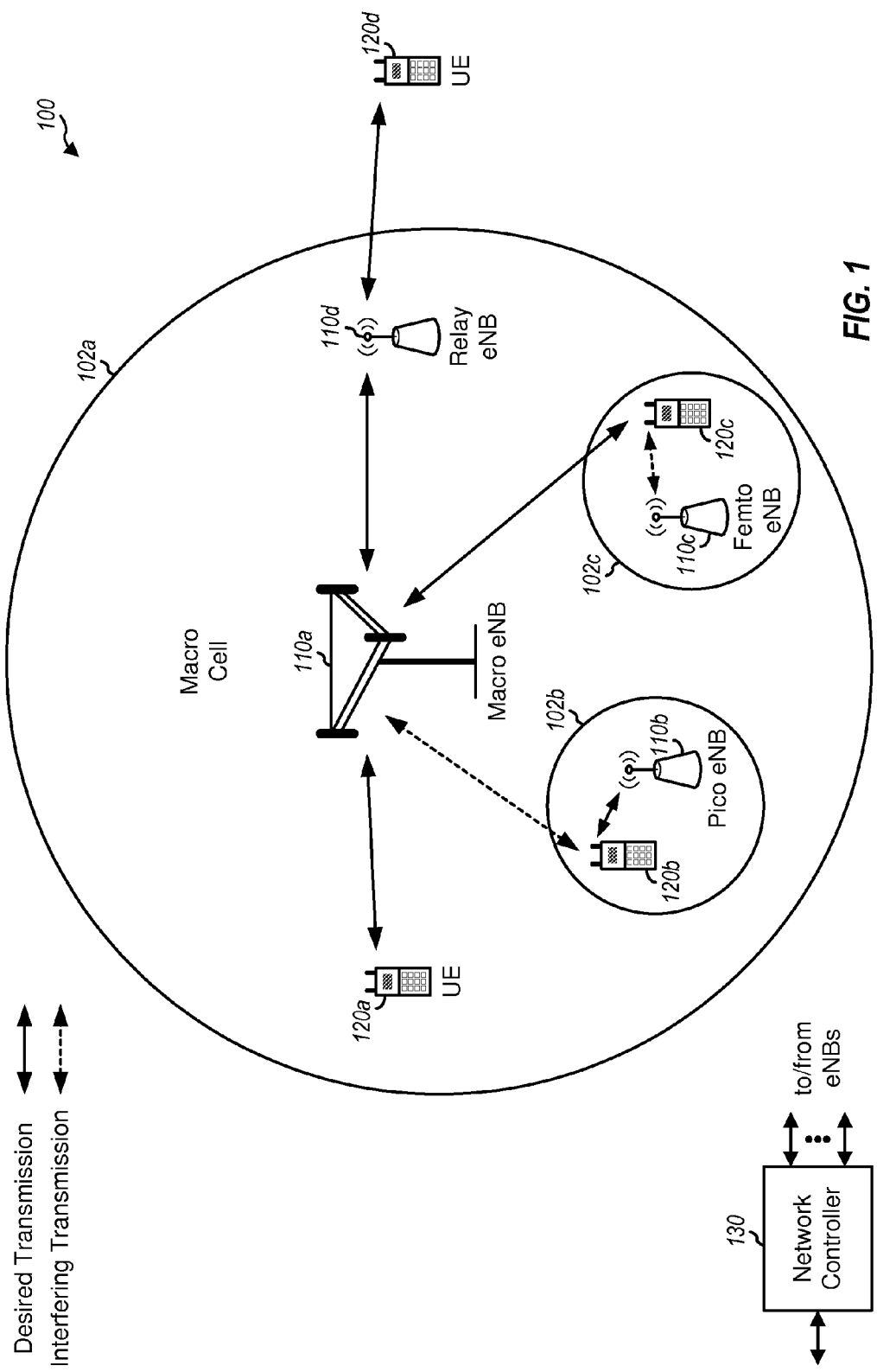
FIG. 1 illustrates a multiple access wireless communication system, in which certain aspects of the present disclosure may be utilized.

FIG. 1 shows a wireless communication network 100 in which RA procedures described herein may be performed. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
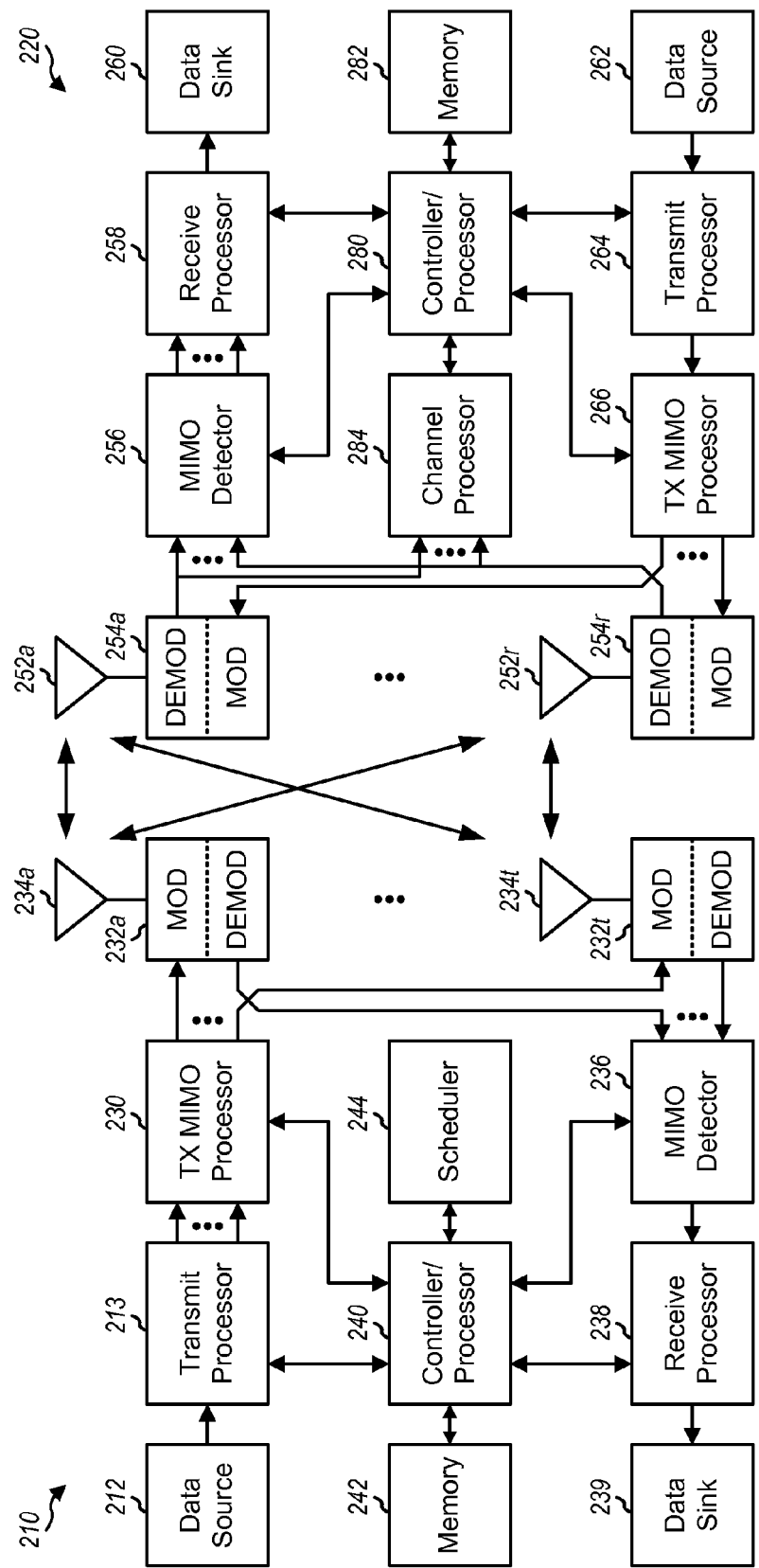
FIG. 2 is a block diagram of a wireless communication system, in which certain aspects of the present disclosure may be utilized.

FIG. 2 shows a block diagram of a design of base station/eNB 210 and a receiving system 220 (e.g., a UE or relay node), which may be one of the base stations/eNBs and one of the UEs in FIG. 1. Base station 210 may be equipped with T antennas 234a through 234t, and receiving system 220 may be equipped with R antennas 252a through 252r, where in general $T \geq 1$ and $R \geq 1$.

At base station 210, a transmit processor 213 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 213 may also process system information (e.g., for SRPI, etc.) and control information (e.g., CQI requests, grants, upper layer signaling, etc.) and provide overhead symbols and control symbols. Processor 213 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At receiving system 220, antennas 252a through 252r may receive the downlink signals from base station 210 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for receiving system 220 to a data sink 260, and provide decoded control information and system information to a controller/processor 280. A channel processor 284 may determine RSRP, RSSI, RSRQ, CQI, etc., as described below.

On the uplink, at receiving system 220, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 210. At base station 210, the uplink signals from receiving system 220 and other UEs may be received by antennas 234, processed by demodulators 232, detected by a MIMO detector 236 if applicable, and further processed by a receive processor 238 to obtain decoded data and control information sent by receiving system 220. Processor 238 may provide the decoded data to a data sink 239 and the decoded control information to controller/processor 240.

Controllers/processors 240 and 280 may direct the operation at base station 210 and receiving system 220, respectively. Processor 240 and/or other processors and modules at base station 210 may perform or direct operations for configuring the receiver system 220 in various manners. Memories 242 and 282 may store data and program codes for base station 210 and receiving system 220, respectively. A scheduler 244 may schedule UEs for data transmission on the downlink and/or uplink.

Figure 3:
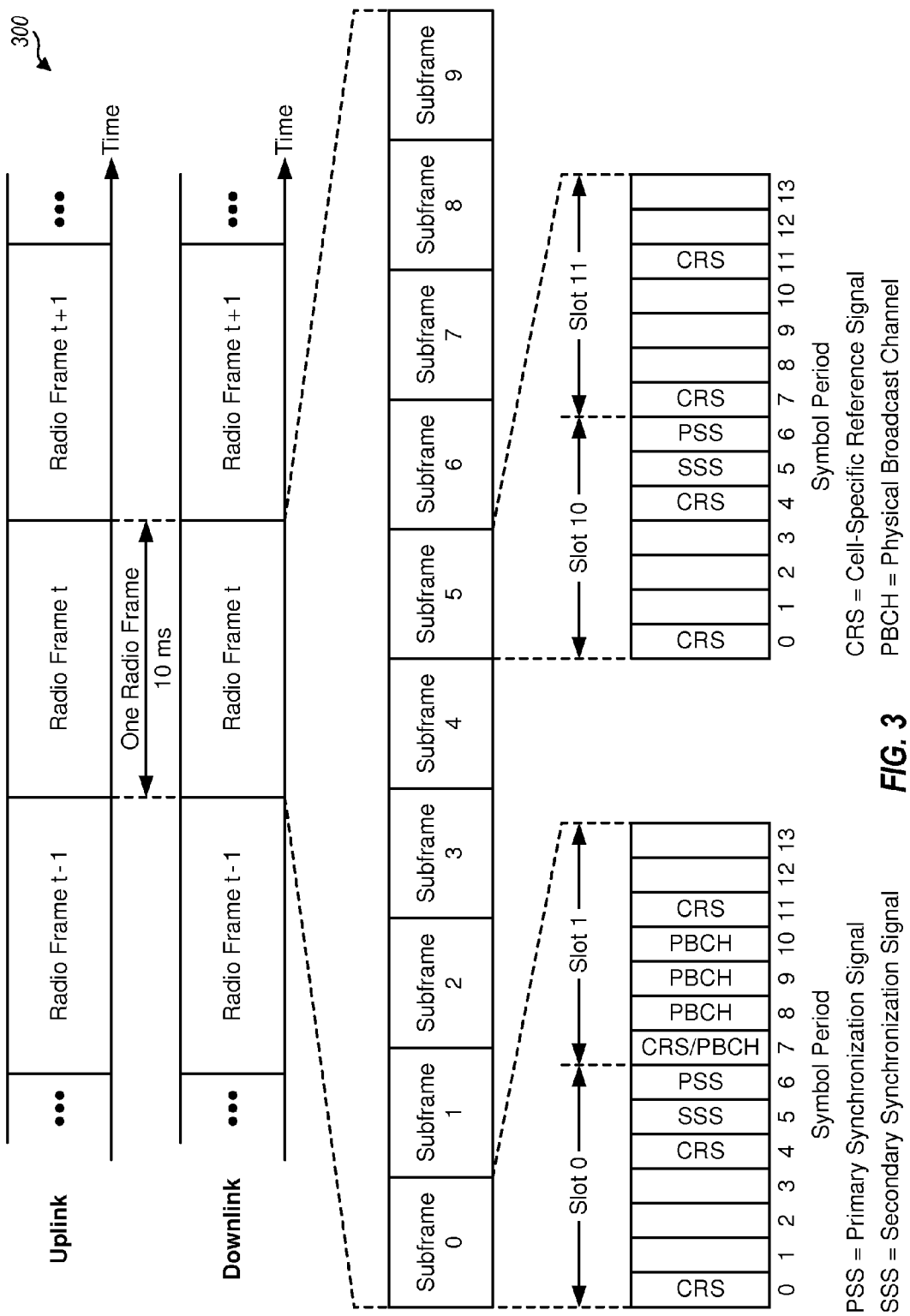
FIG. 3 illustrates an example frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

As described above, wireless communication systems may comprise a relay node associated with a donor base station to provide service to user equipments (UEs). As described above, the relay node may be connected to a radio-access network via the donor base station. The relay node may be used to supplement and extend coverage in a given geographical area by providing service to a plurality of UEs through the donor base station.

Figure 4:
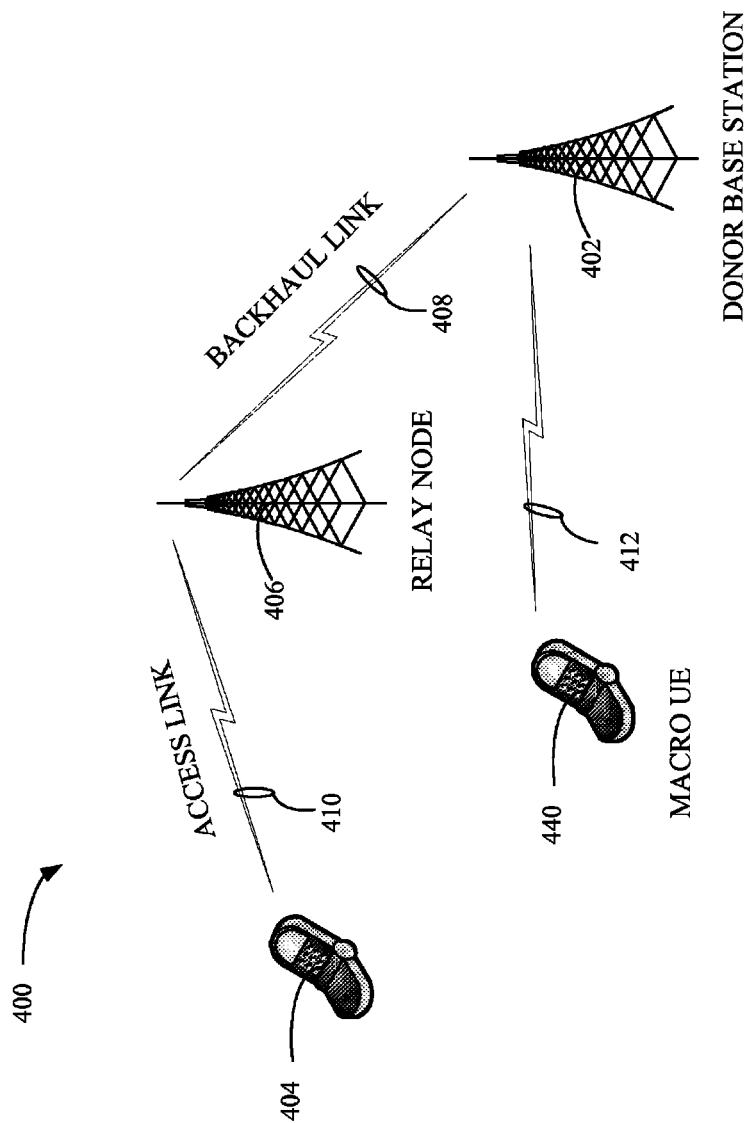
FIG. 4 illustrates an exemplary wireless communication system having a relay, in which certain aspects of the present disclosure may be utilized.

FIG. 4 illustrates an example wireless system 400 in which certain aspects of the present disclosure may be practiced. As illustrated, the system 400 includes a donor base station 402 (also known as a donor cell, a donor access point (AP), a donor BS, a donor eNodeB, or DeNB) that communicates with a UE 404 via a relay node 406 (also known as relay access point, relay base station, or ReNB). As illustrated, one or more UEs 440 (e.g., "macro UEs") may also communicate with the donor base station 402 via a direct link 412 (e.g., with no relay node involved).

The relay node 406 may communicate with the donor BS 402 via a backhaul link 408 and with the UE 404 via an access link 410. In other words, the relay node 406 may receive downlink messages from the donor BS 402 over the backhaul link 408 and relay these messages to the UE 404 over the access link 410. Similarly, the relay node 406 may receive uplink messages from the UE 404 over the access link 410 and relay these messages to the donor BS 402 over the backhaul link 408.

According to certain aspects, the backhaul link 408 may be an "inband" connection, in which a network-to-relay link, such as the backhaul link 408, shares a same band with direct network-to-UE links within a donor cell defined by the donor base station. LTE Rel-8-compatible UEs may be able to connect to the donor in this case. According to certain aspects, the backhaul link may be an "outband" connection, in which a network-to-relay link may not operate in the same band as direct-to-UE links within the donor cell.

According to certain aspects, the relay node 406 may be a "Type 1" relay node compatible with LTE-Advanced. A Type 1 relay node is an inband relaying node generally characterized with the following features: A Type 1 relay node controls cells, each of each appears to a UE as a separate cell distinct from the donor cell. The cells may have their own Physical Cell ID (as defined in LTE Rel-8) and the relay node may transmit its own synchronization channels, reference symbols, and other control information. In the context of a single-cell operation, a UE may receive scheduling information and Hybrid Automatic Repeat Request (HARQ) feedback directly from the relay node, and the UE may send its control channels (e.g., SR, CQI, ACK) to the relay node. To Rel-8 UEs, a Type 1 relay node may appear as a Rel-8 eNodeB (i.e., the Type 1 relay node may be backwards compatible.) To LTE-Advanced-compatible UEs, a Type 1 relay node may appear differently than a Rel-8 eNodeB to enable and allow for further performance enhancements.

According to certain aspects, for in-band relaying, the backhaul link 408 (i.e., the eNodeB-to-relay link) may operate in the same frequency as the access link 410 (i.e., the relay-to-UE link). Due to the fact that relay's transmitter may cause interference with the relay's own receiver, simultaneous eNodeB-to-relay and relay-to-UE transmissions on the same frequency resources may not be feasible. For example, the relay node 406 may have difficulty receiving a control channel from the donor base station 402 during a conventional PDCCH period because the relay node 406 may have to transmit its own reference signals to the UEs 404 during this time. As such, in order to allow inband backhauling of relay traffic on the backhaul link 408, some resources in the time-frequency domain may be set aside for the backhaul link 408 and may not be used for the access link 410 on the respective relay node 406. According to certain aspects, the relay node 406 may be configured for half-duplex operation, as described below, such that a control channel for the backhaul link 408 may be received by the relay node 406 in a time-frequency domain reserved for downlink data transmission from the donor base station 402 to the relay node 406.

According to certain aspects, the relay node 406 may be configured according to general principles of resource partitioning for half-duplex operation. Firstly, downlink backhaul and downlink access links (i.e., eNodeB-to-relay and relay-to-UE) may be time division multiplexed in a single frequency band. In other words, only one of the downlink backhaul and downlink access links may be any time. Secondly, uplink backhaul and uplink access links (i.e., relay-to-eNodeB and UE-to-relay) are also time division multiplexed in a single frequency band. In other words, only one of uplink backhaul and uplink access may be active at any time.

Transmission of downlink and uplink backhaul may be transmitted utilizing radio resources according to certain aspects described herein. For example, at the relay node, a boundary of an access link downlink subframe may be aligned with a boundary of a backhaul link downlink subframe, notwithstanding possible adjustment allowing for relay node transmit and/or receive switching. According to certain aspects, the set of downlink backhaul subframes, during which downlink backhaul transmission may occur, may be semi-statically assigned. The set of uplink backhaul subframes, during which uplink backhaul transmission may occur, may also be semi-statically assigned, or may be implicitly derived from the downlink backhaul subframes using the HARQ timing relationship.

According to certain aspects, a physical control channel (herein referred to as Relay Physical Downlink Control Channel, or "R-PDCCH") may be used to dynamically or "semi-persistently" assign resources, within the semi-statically assigned subframes, for downlink backhaul data (corresponding to a physical channel such as a Relay Physical Downlink Shared Channel, or "R-PDSCH"). According to certain aspects, the R-PDCCH may assign downlink resources in the same and/or in one or more later subframes. According to certain aspects, the R-PDCCH may also be used to dynamically or "semi-persistently" assign resources for uplink backhaul data (corresponding to a physical channel such as a Relay Physical Uplink Shared Channel, "R-PUSCH"). According to certain aspects, the R-PDCCH may assign uplink resources in one or more later subframes.

According to certain aspects, within physical resource blocks (PRBs) semi-statically assigned for R-PDCCH transmission, a subset of the resources may be used for each R-PDCCH. The actual overall set of resources used for R-PDCCH transmission within the above mentioned semi-statically assigned PRBs may vary dynamically between subframes. These resources may correspond to the full set of OFDM symbols available for the backhaul link or be constrained to a subset of these OFDM symbols. The resources that are not used for R-PDCCH within the above-mentioned semi-statically assigned PRBs may be used to carry R-PDSCH or PDSCH. According to certain aspects, the R-PDCCH may be transmitted starting from an OFDM symbol within a subframe that is late enough such that a relay may receive it. R-PDSCH and R-PDCCH may be transmitted within the same PRBs or within separate PRBs as described further below.

According to certain aspects, the detailed R-PDCCH transmitter processing (i.e., channel coding, interleaving, multiplexing, etc.) may re-use LTE Rel-8 functionality to the extent possible, but may allow for the removal of certain unnecessary procedures or bandwidth-occupying procedures by considering the properties of the relay node. According to certain aspects, a "search space" approach for the backhaul link may be adapted from LTE Rel-8, utilizing a common search space that can be semi-statically configured (and may potentially include an entire system bandwidth). Additionally, a relay-node specific search space may be configured that is implicitly or explicitly known by the relay node.

Determining PDSCH Resource Availability

As noted above, while a set of physical resource blocks (PRBs) may be semi-statically assigned for R-PDCCH transmissions, the actual resources used for an actual R-PDCCH transmission may vary dynamically between subframes. Thus, a portion of the resources configured for R-PDCCH may be available for other purposes, such as PDSCH transmissions (to a relay or a direct connected UE). Certain aspects of the present disclosure provide techniques for identifying such resources.

Figure 5:
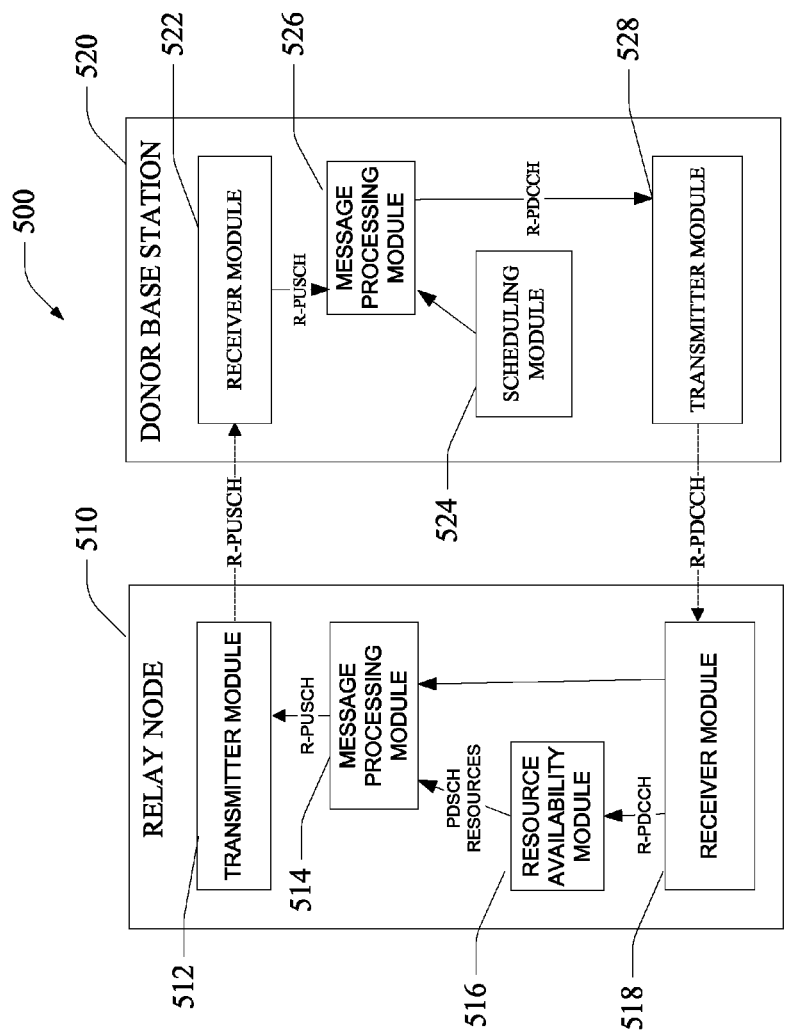
FIG. 5 is a block diagram illustrating example modules of a wireless communication system with apparatus capable of implementing certain aspects of the present disclosure.

FIG. 5 illustrates an example wireless system 500 with components capable for performing operations described herein. As illustrated, the wireless system 500 includes a relay node 510 and a donor base station 520. While not illustrated, the relay node 510 may allow the base station 520 to communicate with a plurality of UEs.

According to certain aspects, the donor base station 520 may include a scheduling module 524 and message processing module 526. The scheduling module 524 may generally be configured to determine resources to use for various messaging in each subframe. The message processing module 526 may generate messages to be transmitted using the determined resources. As illustrated, the message processing module 526 may generate an R-PDCCH message to be transmitted to the relay node 510, via a transmitter module 528.

The relay node 510 may receive the R-PDCCH message, via a receiver module 518. As illustrated, the relay node 510 may also include a transmitter module 512 for transmitting various message generated by the module 514, such as relay physical uplink shared channel (R-PUSCH) or relay physical uplink control channel (R-PUCCH) messages.

According to certain aspects, the R-PDCCH message may be transmitted from the donor BS 520 on a subset of resources (semi-statically) configured for R-PDCCH transmissions and, in some cases, may assign a R-PDSCH to the relay node. As illustrated, the relay node 510 may include a resource availability module 516 configured to determine resources available for the R-PDSCH transmission. The determined resources may be provided to a message processing module 514 to help in processing the R-PDSCH transmission.

Various "placement" options are available for the resources configured for R-PDCCH transmissions within available resource space. For example, FIG. 6 a pure frequency division multiplexing (FDM) scheme, in which a number of resource blocks (RBs) are allocated exclusively for R-PDCCH transmissions.

Figure 6:
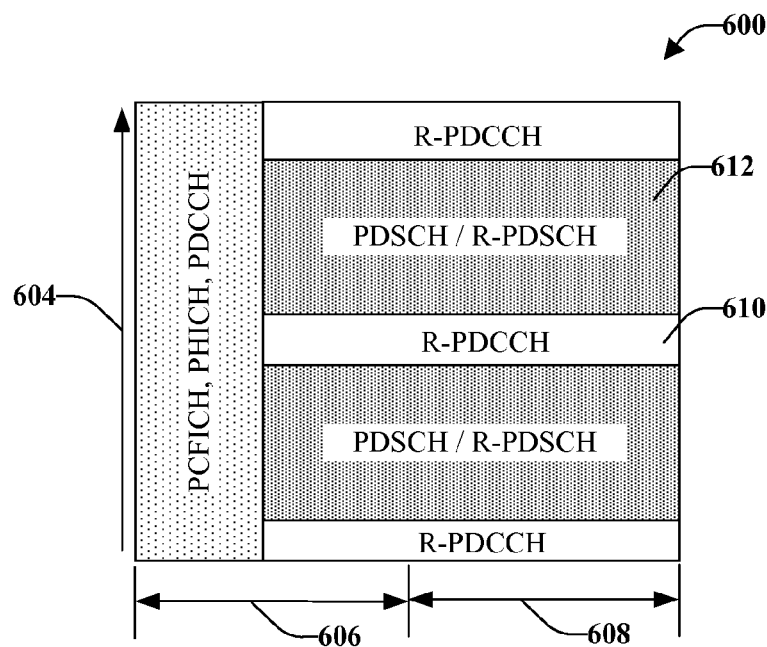
FIGS. 6-8 illustrate example resource allocation for relay physical downlink control channels (PDCCHs), in accordance with aspects of the present disclosure.

FIG. 6 illustrates a Pure FDM transmission scheme 600 wherein a limited number of resource blocks (RBs) are allocated exclusively for transmitting R-PDCCH (and possibly Relay Physical HARQ Indicator Channel, or R-PHICH, if supported). As illustrated, a set of resources in the frequency domain 604 are allocated for transmission of R-PDCCH across a time domain comprising a first time slot 606 and a second time slot 608. According to certain aspects, the Pure FDM scheme 600 separates a relay's control region (i.e., R-PDCCH 610) from regular PDSCH and the relay's R-PDSCH transmissions 612, which facilities multiplexing and minimizes scheduling complexity. As illustrated, a single R-PDCCH 610 is interleaved across a limited number of RBs in order to achieve frequency and interference diversity.

Figure 7:
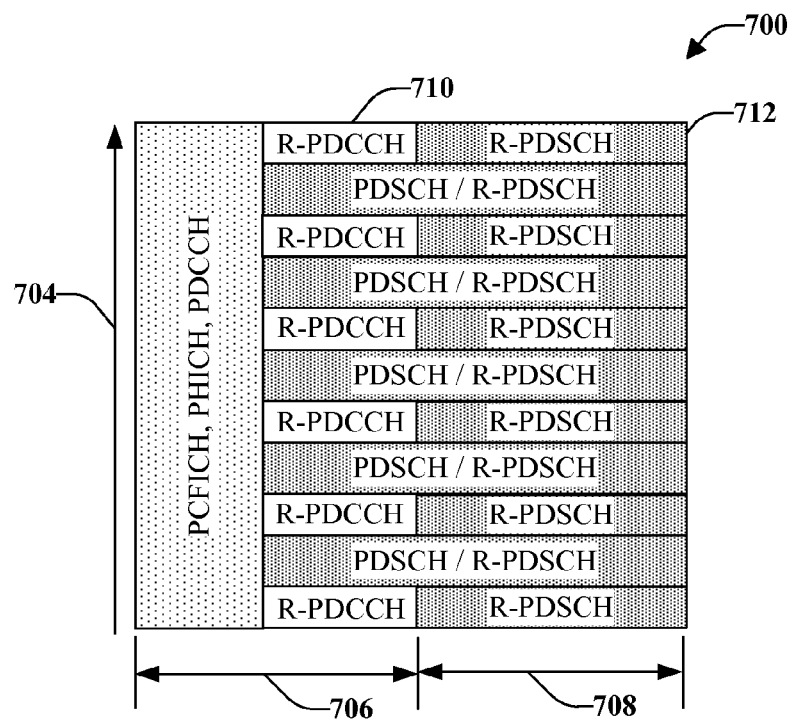

FIG. 7 illustrates a Hybrid FDM-TDM transmission scheme 700, wherein an R-PDCCH 710 may be transmitted on a subset of RBs from the frequency domain 704. According to certain aspects, among those RBs, only symbols from within a first time slot 706 for transmission of the R-PDCCH. As illustrated, the remaining RBs may be utilized for transmitting the relay's R-PDSCH data transmission 712 (or for other PDSCH transmissions, for example, to a UE).

Figure 8:
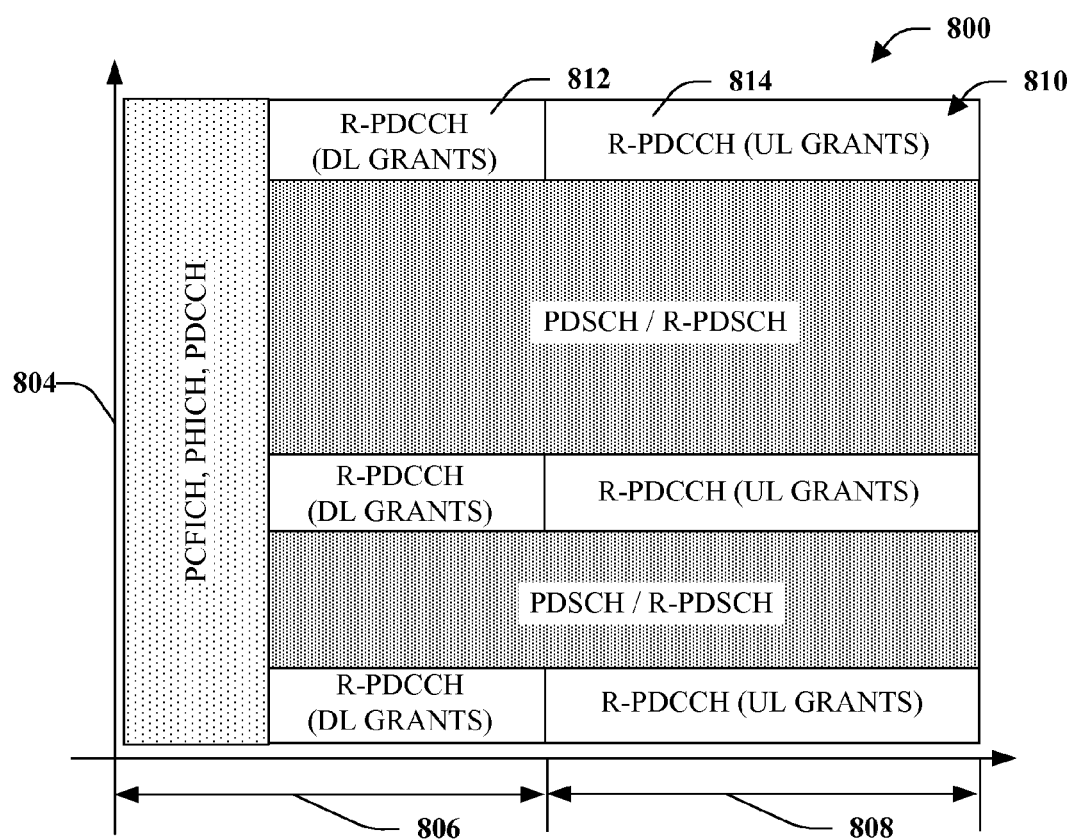

FIG. 8 illustrates a Pure FDM transmission scheme 800 for transmitting R-PDCCH 810 according to certain aspects of the present disclosure. Similar to the transmission scheme illustrated in FIG. 6, a set of PRBs are allocated across the frequency domain 804 for transmission of R-PDCCH 810 across a first time slot 806 and a second time slot 808. As illustrated, R-PDCCH comprising downlink (DL) grants 812 for the relay node may be transmitted in the first slot 806, while R-PDCCH comprising uplink (UL) grants may be transmitted in the second slot 808. It is noted that the grants in the same PRB pair may or may not be associated with the same relay node.

According to certain aspects, a transmission scheme may be provided wherein DL grants 812 are always be transmitted in the first time slot 806 of a subframe for early PDSCH decoding purposes. According to certain aspects, if a DL grant is transmitted in a first PRBs of a given PRB pair, then an UL grant may be transmitted in a second PRB of the PRB pair. Otherwise, an UL grant may be transmitted in either the first or second PRB of the PRB pair. According to certain aspects, in cases of transmission of a demodulation reference signal (DM-RS), the DL grant and UL grant in a PRB pair may be associated with the same relay node. In other words, no resource elements (REs) may in such a PRB pair may be used for a different relay node. According to certain aspects, in cases of a common reference signal (CRS) transmission, the DL grant and UL grant in a PRB pair may be for the same relay node or may be for different relays.

According to certain aspects, a set of PRBs semi-statically configured for R-PDCCH transmissions may be available to a UE or a relay node. Alternatively, the relay node may know of only a partial subset of the resources configured for R-PDCCH transmissions. For the latter case, a relay node may monitor a subset of total PRBs reserved for R-PDCCH. In some cases, a donor base station may schedule PDSCH/R-PDSCH such that, from the perspective of relay node and/or a macro UE, once PDSCH/R-PDSCH is assigned, other than the PRBs used for the relay node-specific R-PDCCH, other semi-statically configured R-PDCCH resources are available for the PDSCH/R-PDSCH, if such resource is assigned to the PDSCH/R-PDSCH.

According to certain aspects, the resources configured for PDCCH transmissions comprise PRB pairs, each PRB pair comprising a first PRB in a first part of a subframe and a second PRB in a second part of the subframe. According to certain aspects, the first and second parts of the subframe comprise first and second time slots. As an example, this configuration may be used if the R-PDCCH demodulation is based on a RN-specific or UE-specific demodulation reference signal (DM-RS). As another example, this configuration may be used if the R-PDCCH demodulation is based on a common reference signal (CRS). For example, the configured PDCCH resources may have a granularity of one PRB pair, or two or more PRB pairs. The granularity can be further dependent on a system bandwidth.

According to certain aspects, the resources configured for PDCCH transmissions comprise a first set of PRBs in a first part of a subframe for DL grants, and a second set of PRBs in a second part of a subframe for UL grants. As an example, this configuration may be used if the R-PDCCH demodulation is based on a CRS. According to certain aspects, the first and second parts of the subframe comprise first and second time slots. According to certain aspects, the first set of PRBs and the second set of PRBs are the same. According to certain aspects, the first set of PRBs and the second set of PRBs are different. For example, the configured PDCCH resources may have a granularity of one PRB pair, or two or more PRB pairs. The granularity can be further dependent on a system bandwidth.

As noted above, a relay node may include a mechanism for determining resources available for R-PDSCH transmissions, based on the resources configured for R-PDCCH transmissions and resources assigned for R-PDSCH in an actual PDCCH transmission.

Figure 9:
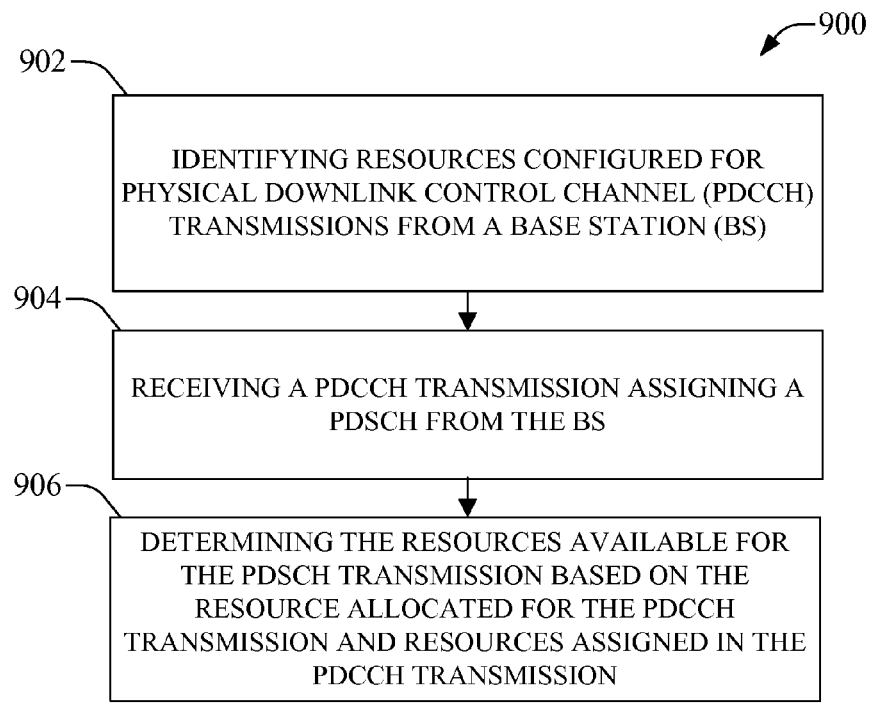
FIG. 9 illustrates example operations that may be performed by a relay node to detect control information, in accordance with aspects of the present disclosure.

FIG. 9 illustrates example operations 900 that may be performed (for example, by a relay node or macro UE) to determine resources available for PDSCH transmissions. The operations 900 begin, at 902, by identifying resources configured for physical downlink control channel (PDCCH) transmissions from a base station (BS). At 904, a PDCCH transmission assigning a PDSCH from the BS is received and, at 906, resources available for the PDSCH transmission are determined based on the resource allocated for the PDCCH transmission and resources assigned in the PDCCH transmission.

According to certain aspects, a relay node may determine whether resources allocated for R-PDCCH, in the second part (or second slot) are available for R-PDSCH. For example, a relay node may determine whether R-PDCCH and R-PDSCH overlap. For example, when no overlap exists, as in the pure FDM case shown in FIG. 7, a relay node may determine all the resources assigned to R-PDSCH are available for R-PDSCH. However, when an overlap exists, as shown in FIG. 8, a relay node may need to consider other information to determine what resources are available for PDSCH.

According to certain aspects, a relay node may identify a subset of resources that do not collide with a downlink R-PDCCH and these resources can be considered available for R-PDSCH. For example, a relay node may receive a downlink R-PDCCH on PRB n, which assigns $\{n-1, n, n+1, n+2\}$ PRBs in a first part (e.g., first time slot) and $\{m_1, m_2, m_3, m_4\}$ in a second part (e.g., a second time slot). In some cases, the set of PRBs in the first part may be the same as the set of PRBs in the second part. That is, $m_1=n-1$, $m_2=n$, $m_3=n+1$ and $m_4=n+2$. As an example, this may correspond to a case when slot hopping is disabled for a R-PDSCH transmission. In other cases, the set of PRBs in the first part may be different from the set of PRBs in the second part. As an example, this may correspond to a case when slot hopping is enabled for a R-PDSCH transmission. The relay node 310 may then identify $\{n-1, n+1, n+2\}$ and $\{m1, m3, m4\}$ as available for R-PDSCH.

According to certain aspects, a relay node may determine a PRB in the second time slot of a PRB pair configured for PDCCH transmissions is available for PDSCH if it detects an uplink grant in the second time slot.

According to certain aspects, implicit signaling may be utilized. For example, if a relay node receives an R-PDCCH transmission assigning a PDSCH that overlaps with a PRB pair in which a PDCCH with a downlink assignment is detected in a first time slot, the relay node may take this as an implicit indication that there are resources available for a PDSCH transmission in the second slot of that same PRB pair.

According to certain aspects, in addition to implicit signaling or a relay node having to perform detection, a donor base station may provide an indication of PDSCH resource availability. To indicate the availability of a second part, at least one bit information can be conveyed in the R-PDCCH. For example, the 1-bit information can be conveyed via adding a new bit, by interpreting an existing bit, or by a R-PDCCH CRC masking. The one-bit information can be conveyed by R-PDCCH assigning DL grants and indicating whether UL grant is in the 2nd part, or whether the second part is available for R-PDSCH. Additionally or separately, the one-bit information can be conveyed by R-PDCCH assigning UL grants as well. Upon detecting either a R-PDCCH for a DL grant or a R-PDCCH for a UL grant, a relay node or a UE knows whether it is being scheduled a DL grant and a UL grant simultaneously, or only one of them, and/or whether the second part is available for R-PDSCH when overlap exists.

According to certain aspects, a RN or a UE can be semi-statically configured to use one of the two or more modes. As an example, it can be configured to always assume the PRB(s) in a second part is available when overlap exists. It can also be configured to always assume the PRB(s) in a second part is not available when overlap exists.

Figure 10:
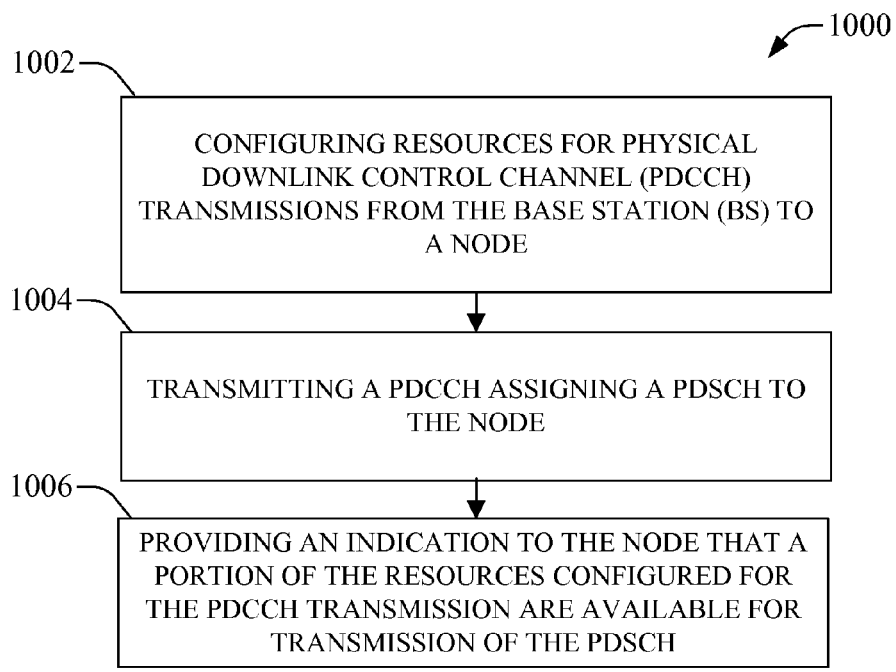
FIG. 10 illustrates example operations that may be performed by a base station to transmit control information, in accordance with aspects of the present disclosure.

FIG. 10 illustrates example operations 1000 that may be performed by a donor base station to provide an indication of PDSCH resource availability. At 1002, the donor base station configures (e.g., semi-statically) resources for physical downlink control channel (PDCCH) transmissions from the base station (BS) to a node. At 1004, the donor base station transmits a PDCCH assigning a PDSCH to the node. At 1006, the donor base station provides an indication to the node that a portion of the resources configured for the PDCCH transmission are available for transmission of the PDSCH.

As noted above, the indication may be explicit or implicit. For example, a donor base station may provide an indication of that there is an uplink grant or some other indication that PDSCH resources are available. (e.g., as a bit in an R-PDCCH transmission). Even in the implicit signaling described above, the fact that a donor base station assigns a PDSCH that overlaps with a PRB pair in which a PDCCH with a downlink assignment is sent in a first time slot may be considered as an indication PDSCH resources are available in the second time slot.

According to certain aspects, resource mapping for R-PDSCH may be done in a manner that takes into consideration the resource availability determination described herein. Resource mapping (e.g., rate matching) is conventionally done is a frequency-first, time-second approach as illustrated in the diagram 1100 of FIG. 11, mapping resources for PDSCH regions 1110.

Figure 11:
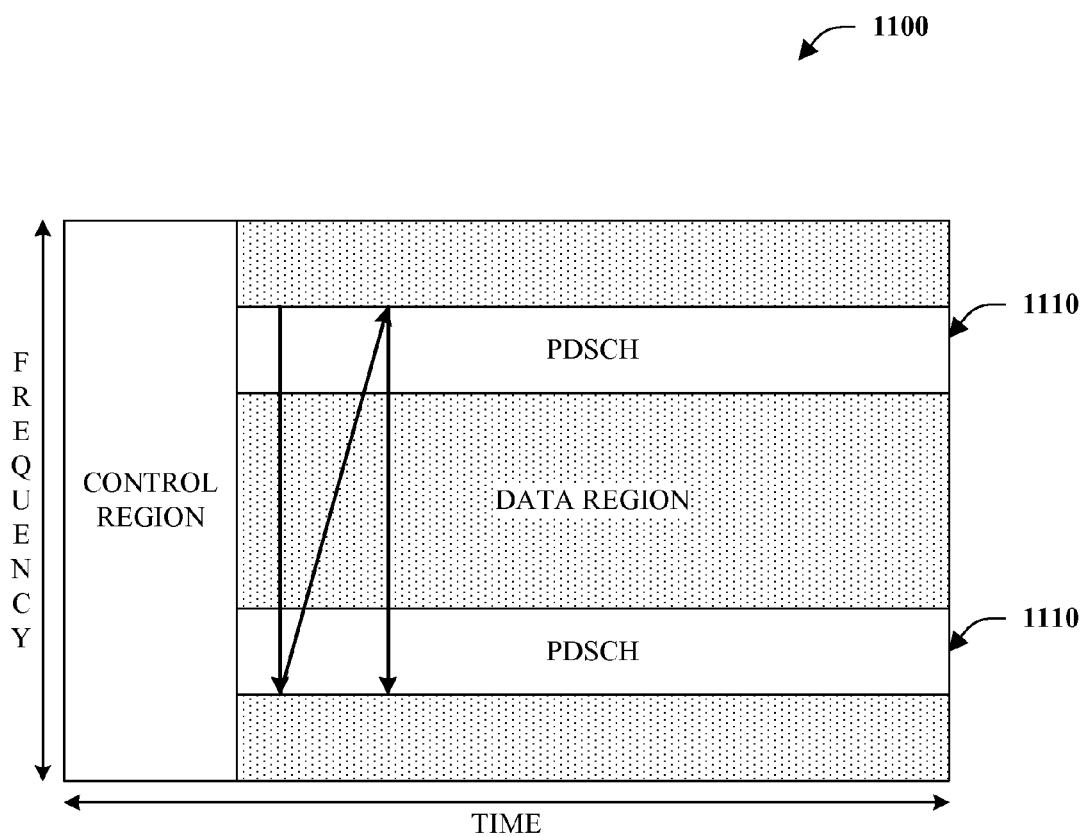
FIGS. 11-14 illustrate example resource mapping, in accordance with aspects of the present disclosure.
Figure 12:
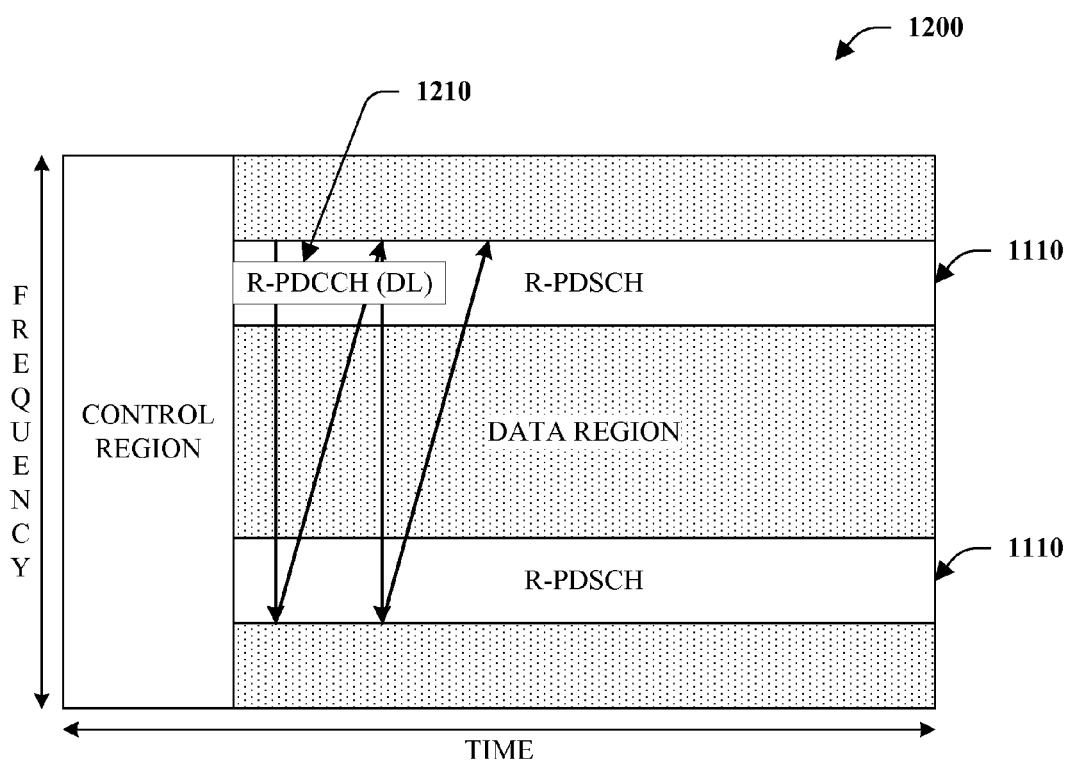
Figure 13:
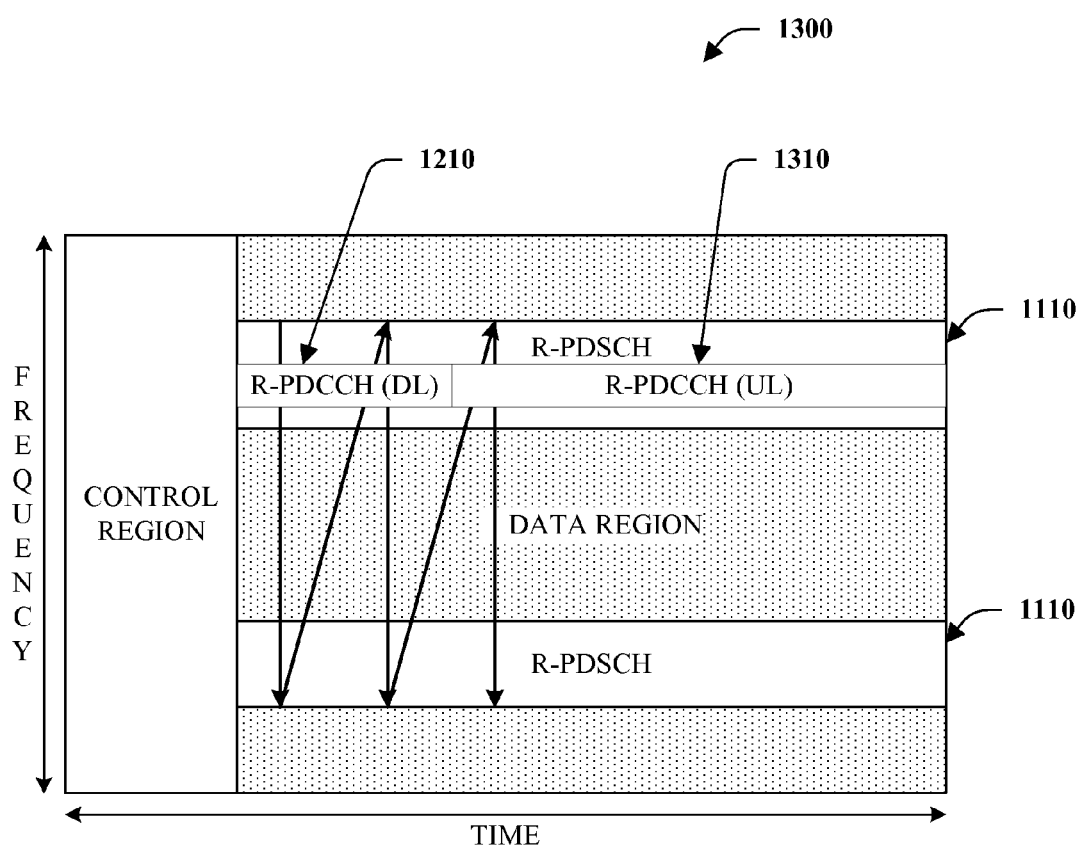
Figure 14:
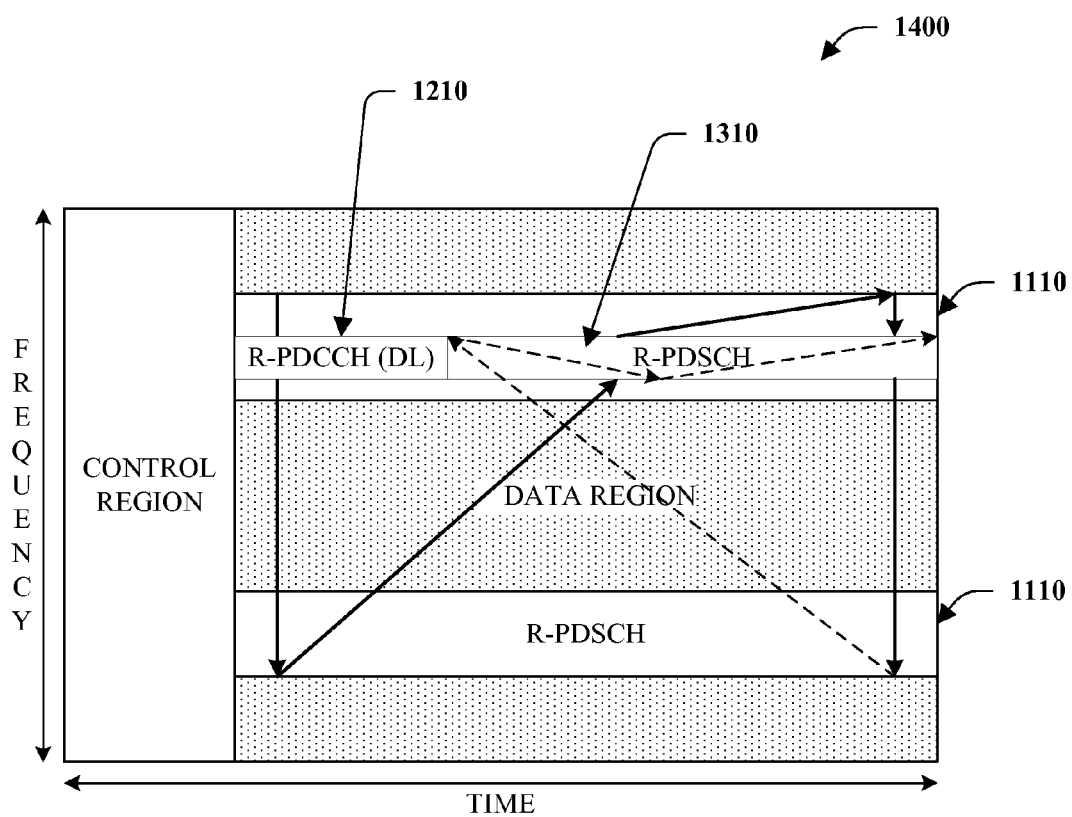

As illustrated in the diagram 1200 of FIG. 12, however, rate matching for R-PDSCH may differ from the approach illustrated in FIG. 11 because the resource mapping may skip (rate match around) a first part of the set of PRBs carrying R-PDCCHs downlink grants 1210. Further, as illustrated in FIG. 13, a second set of PRBs used for PDCCH uplink grants 1310 may also be skipped. As illustrated in the diagram 1400 of FIG. 14, rate matching (or PDSCH RE mapping) may be done such that the REs of the partial RB-pairs ("R-PDSCH") may be populated last (as indicated by the dashed lines). This may help address possible error events, for example, in cases where there is no explicit indication on whether or not the second part of the RB-pair is used for PDSCH transmission. When the RN-specific R-PDCCH and R-PDSCH are not overlapped, it is expected that rate matching for R-PDSCH is the same as legacy PDSCH It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting may comprise a transmitter, such as the transmitter unit 254 of the receiver system 220 (e.g., the access terminal) depicted in FIG. 2 or the transmitter unit 232 of the transmitter system 210 (e.g., the access point) shown in FIG. 2. Means for receiving may comprise a receiver, such as the receiver unit 254 of the receiver system 220 depicted in FIG. 2 or the receiver unit 232 of the transmitter system 210 shown in FIG. 2. Means for determining and/or means for performing may comprise a processing system, which may include one or more processors, such as the processor 280 and RX data processor 258 of the receiver system 220 or the processor 230 of the transmitter system 210 illustrated in FIG. 2. These means may also comprise any suitable combination of the transmitter modules 512, 528, the receiver modules 518, 522, the modules 514, 516, 524, and 526 of FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for determining resources available for physical downlink shared channel (PDSCH) transmissions from a base station, comprising:
   identifying resources allocated for physical downlink control channel (PDCCH) transmissions from a base station (BS);
   receiving a PDCCH transmission assigning resources for a PDSCH from the BS; and
   determining the resources available for the PDSCH transmission based on at least one identified resource allocated for the PDCCH transmission and resources assigned in the PDCCH transmission for PDSCH, wherein the determined resources include a portion of the resources allocated for PDCCH transmissions, and wherein the determining comprises determining that the resources available for the PDSCH transmission includes a second physical resource block (PRB) of a PRB pair in a second time slot if the resources assigned in the PDCCH transmission overlap with a first PRB of the same pair allocated for the PDCCH transmission.

2. The method of claim 1, wherein:
the base station comprises a donor BS, the PDCCH comprises a relay PDCCH (R-PDCCH), and the determining is performed by a relay node.

3. The method of claim 1, wherein:
the determining further comprises determining whether an uplink grant is detected in the second part of the subframe.

4. The method of claim 3, wherein:
the determining further comprises assuming all second PRBs in the second part of the subframe are available for the PDSCH transmission if an uplink grant is not detected in the second part of the subframe.

5. The method of claim 1, wherein the determining further comprises:
determining whether second PRBs in the second part of the subframe are available for the PDSCH transmission based, at least in part, on an indication provided by the BS.

6. The method of claim 5, wherein the indication is conveyed as one or more bits of the PDCCH transmission.

7. The method of claim 5, wherein the indication comprises an indication of whether or not an R-PDCCH transmission in the second part comprises an uplink grant.

8. The method of claim 1, wherein the determining further comprises:
determining the resources available for the PDSCH transmission includes the assigned PDSCH resources that do not overlap the resources allocated for the PDCCH transmission.

9. The method of claim 1, where the PDSCH transmission is mapped onto the determined resources by a rate-matching operation.

10. The method of claim 1, wherein the determining is performed at a user equipment (UE) to determine resources available for the PDSCH transmission to the UE.

11. An apparatus for determining resources available for physical downlink shared channel (PDSCH) transmissions from a base station, comprising:
means for identifying resources allocated for physical downlink control channel (PDCCH) transmissions from a base station (BS);
means for receiving a PDCCH transmission assigning resources for a PDSCH from the BS; and
means for determining the resources available for the PDSCH transmission based on at least one identified resource allocated for the PDCCH transmission and resources assigned in the PDCCH transmission for PDSCH, wherein the determined resources include a portion of the resources allocated for PDCCH transmissions, and wherein the means for determining comprises means for determining that the resources available for the PDSCH transmission includes a second physical resource block (PRB) of a PRB pair in a second time slot if the resources assigned in the PDCCH transmission overlap with a first PRB of the same pair allocated for the PDCCH transmission.

12. The apparatus of claim 11, wherein:
the base station comprises a donor BS, the PDCCH comprises a relay PDCCH (R-PDCCH), and the means for determining is performed by a relay node.

13. The apparatus of claim 11, wherein:
the means for determining further comprises means for determining whether an uplink grant is detected in the second part of the subframe.

14. The apparatus of claim 13, wherein:
the means for determining further comprises means for assuming all second PRBs in the second part of the subframe are available for the PDSCH transmission if an uplink grant is not detected in the second part of the subframe.

15. The apparatus of claim 11, wherein the means for determining further comprises:
means for determining whether second PRBs in the second part of the subframe are available for the PDSCH transmission based, at least in part, on an indication provided by the BS.

16. The apparatus of claim 15, wherein the indication is conveyed as one or more bits of the PDCCH transmission.

17. The apparatus of claim 15, wherein the indication comprises an indication of whether or not an R-PDCCH transmission in the second part comprises an uplink grant.

18. The apparatus of claim 11, wherein the means for determining further comprises:
means for determining the resources available for the PDSCH transmission includes the assigned PDSCH resources that do not overlap the resources allocated for the PDCCH transmission.

19. The apparatus of claim 11, where the PDSCH transmission is mapped onto the determined resources by a rate-matching operation.

20. The apparatus of claim 11, wherein the means for determining is performed at a user equipment (UE) to determine resources available for the PDSCH transmission to the UE.

21. An apparatus for determining resources available for physical downlink shared channel (PDSCH) transmissions from a base station, comprising:
at least one processor configured to:
identify resources allocated for physical downlink control channel (PDCCH) transmissions from a base station (BS);
receive a PDCCH transmission assigning resources for a PDSCH from the BS; and
determine the resources available for the PDSCH transmission based on at least one identified resource allocated for the PDCCH transmission and resources assigned in the PDCCH transmission for PDSCH, wherein the determined resources include a portion of the resources allocated for PDCCH transmission, and wherein the at least one processor is configured to determine that the resources available for the PDSCH transmission includes a second physical resource block (PRB) of a PRB pair in a second time slot if the resources assigned in the PDCCH transmission overlap with a first PRB of the same pair allocated for the PDCCH transmission; and
a memory coupled with the at least one processor.

22. A computer-program product for determining resources available for physical downlink shared channel (PDSCH) transmissions from a base station, comprising:
a non-transitory computer-readable medium comprising code for:
identifying resources allocated for physical downlink control channel (PDCCH) transmissions from a base station (BS);
receiving a PDCCH transmission assigning resources for a PDSCH from the BS; and determining the resources available for the PDSCH transmission based on at least one identified resource allocated for the PDCCH transmission and resources assigned in the PDCCH transmission for PDSCH, wherein the determined resources include a portion of the resources allocated for PDCCH transmissions, and wherein the determining comprises determining that the resources available for the PDSCH transmission includes a second physical resource block (PRB) of a PRB pair in a second time slot if the resources assigned in the PDCCH transmission overlap with a first PRB of the same pair allocated for the PDCCH transmission.

23. A method for indicating resources available for physical downlink shared channel (PDSCH) transmissions from a base station, comprising:
allocating resources for physical downlink control channel (PDCCH) transmissions from the base station (BS) to a node;
transmitting a PDCCH assigning resources for a PDSCH to the node; and
providing an indication via the PDCCH to the node that a portion of the resources allocated for PDCCH transmissions are available for transmission of the PDSCH, wherein providing the indication comprises transmitting the PDCCH that assigns resources that overlap with a first physical resource block (PRB) of a PRB pair allocated for the PDCCH transmission as an indication that the resources available for the PDSCH transmission include a second PRB of the same PRB pair in a second time slot.

24. The method of claim 23, wherein:
the BS comprises a donor BS, the PDCCH comprises a relay PDCCH (R-PDCCH), and the node is a relay node.

25. The method of claim 24, wherein providing the indication comprises:
transmitting the R-PDCCH assigning resources that overlap with the resources allocated for the R-PDCCH transmission.

26. The method of claim 24, wherein:
the resources allocated for R-PDCCH transmissions comprise physical resource block (PRB) pairs.

27. The method of claim 26, wherein the indication comprises one or more bits of the R-PDCCH transmission that indicate whether second PRBs of PRB pairs in a second part of the subframe are available for the PDSCH transmission.

28. The method of claim 23, wherein providing the indication further comprises:
transmitting the PDCCH that assigns a set of resources that does not overlap with the resources allocated for the PDCCH transmission as an indication that the resources available for the PDSCH transmission include the set of assigned resources.

29. The method of claim 23, wherein:
the indication conveyed indicates whether an uplink grant is transmitted in the second part of the subframe.

30. The method of claim 23, where the PDSCH is mapped to the portion of the resources by a rate-matching operation.

31. The method of claim 23, wherein the PDCCH comprises a relay PDCCH (R-PDCCH) and the node is a user equipment (UE).

32. An apparatus for indicating resources available for physical downlink shared channel (PDSCH) transmissions from a base station, comprising:
means for allocating resources for physical downlink control channel (PDCCH) transmissions from the base station (BS) to a node;
means for transmitting a PDCCH assigning resources for a PDSCH to the node; and
means for providing an indication via the PDCCH to the node that a portion of the resources allocated for PDCCH transmissions are available for transmission of the PDSCH, wherein means for providing the indication comprises means for transmitting the PDCCH that assigns resources that overlap with a first physical resource block (PRB) of a PRB pair allocated for the PDCCH transmissions as an indication that the resources available for the PDSCH transmission include a second PRB of the same PRB pair in a second time slot.

33. The apparatus of claim 32, wherein:
the BS comprises a donor BS, the PDCCH comprises a relay PDCCH (R-PDCCH), and the node is a relay node.

34. The apparatus of claim 33, wherein the means for providing the indication comprises:
means for transmitting the R-PDCCH assigning resources that overlap with the resources allocated for the R-PDCCH transmission.

35. The apparatus of claim 33, wherein:
the resources allocated for R-PDCCH transmissions comprise physical resource block (PRB) pairs.

36. The apparatus of claim 35, wherein the indication comprises one or more bits of the R-PDCCH transmission that indicate whether second PRBs of PRB pairs in a second part of the subframe are available for the PDSCH transmission.

37. The apparatus of claim 32, wherein the means for providing the indication further comprises:
means for transmitting the PDCCH that assigns a set of resources that does not overlap with the resources allocated for the PDCCH transmission as an indication that the resources available for the PDSCH transmission include the set of assigned resources.

38. The apparatus of claim 32, wherein:
the indication conveyed indicates whether an uplink grant is transmitted in the second part of the subframe.

39. The apparatus of claim 32, where the PDSCH is mapped to the portion of the resources by a rate-matching operation.

40. The apparatus of claim 32, wherein the PDCCH comprises a relay PDCCH (R-PDCCH) and the node is a user equipment (UE).

41. An apparatus for indicating resources available for physical downlink shared channel (PDSCH) transmissions from a base station, comprising:
at least one processor configured to:
allocate resources for physical downlink control channel (PDCCH) transmissions from the base station (BS) to a node;
transmit a PDCCH assigning resources for a PDSCH to the node; and
provide an indication via the PDCCH to the node that a portion of the resources allocated for PDCCH transmissions are available for transmission of the PDSCH, wherein the at least one processor is configured to provide the indication by transmitting the PDCCH that assigns resources that overlap with a first physical resource block (PRB) of a PRB pair allocated for the PDCCH transmissions as an indication that the resources available for the PDSCH transmission include a second PRB of the same PRB pair in a second time slot; and
a memory coupled with the at least one processor.

42. A computer-program product for indicating resources available for physical downlink shared channel (PDSCH) transmissions from a base station, comprising:

a non-transitory computer-readable medium comprising code for:
    allocating resources for physical downlink control channel (PDCCH) transmissions from the base station (BS) to a node;
    transmitting a PDCCH assigning resources for a PDSCH to the node; and
    providing an indication via the PDCCH to the node that a portion of the resources allocated for PDCCH transmissions are available for transmission of the PDSCH, wherein providing the indication comprises transmitting the PDCCH that assigns resources that overlap with a first physical resource block (PRB) of a PRB pair allocated for the PDCCH transmissions as an indication that the resources available for the PDSCH transmission include a second PRB of the same PRB pair in a second time slot.

* * * * *